UNITED STATES PATENT OFFICE.

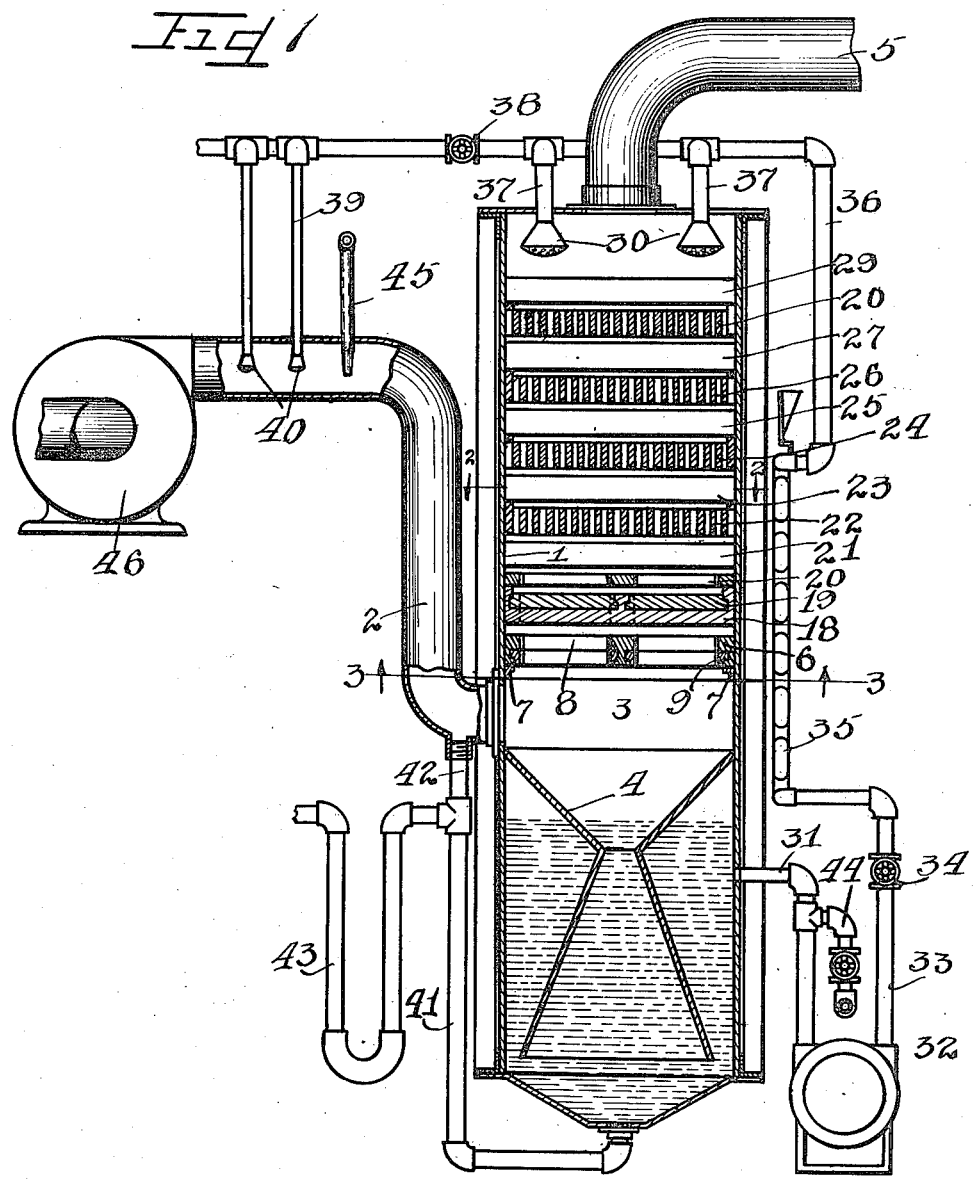

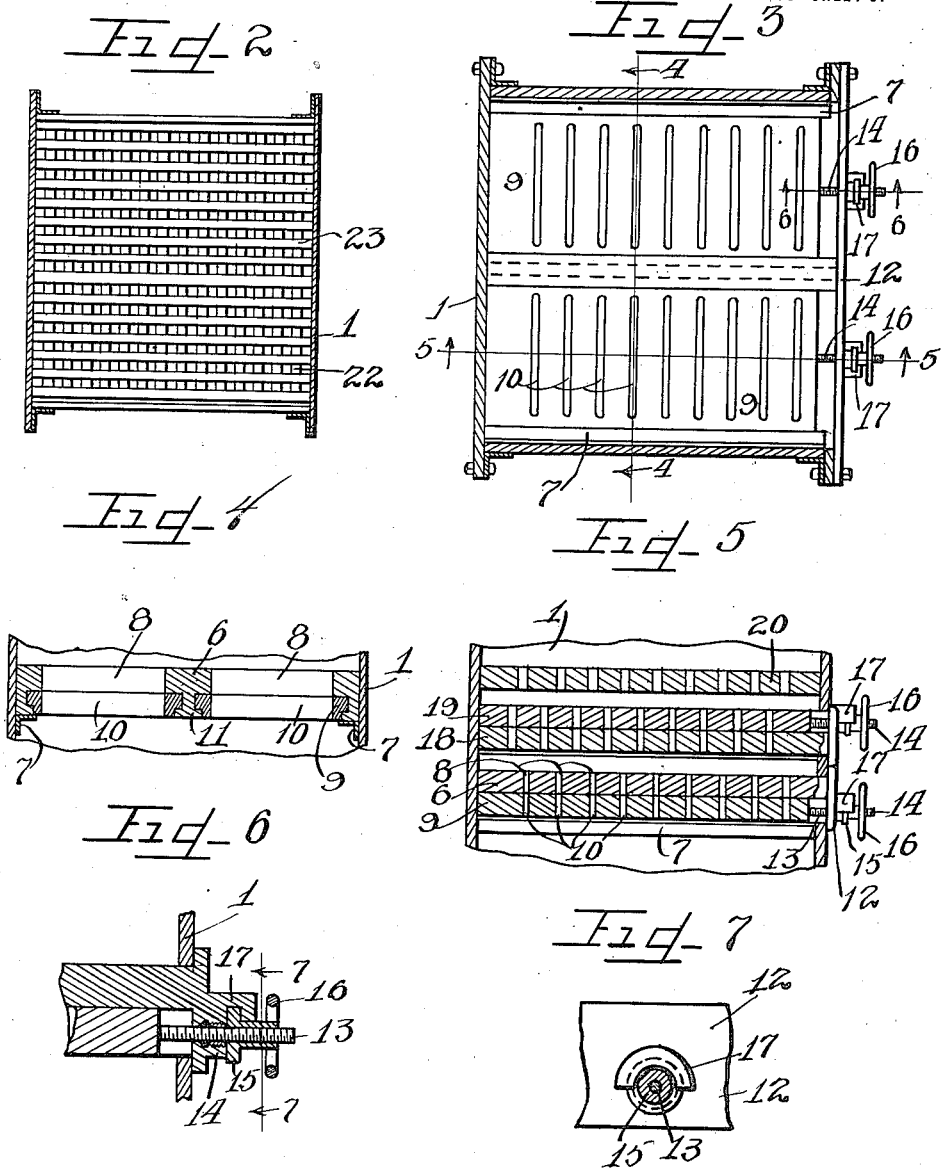

BENJAMIN M. FERGUSON, OF CHICAGO, ILLINOIS.

GAS-SCRUBBING APPARATUS.

1,176,747. Specification of Letters Patent. Patented Mar. 28, 1916.

Continuation of application Serial No. 832,919, filed April 18, 1914. This application filed March 4, 1915. Serial No. 12,005.

*To all whom it may concern:*

Be it known that I, BENJAMIN M. FERGUSON, a citizen of the United States, and a resident of the city of Chicago, in the county of Cook and State of Illinois, have invented certain new and useful Improvements in Gas-Scrubbing Apparatus; and I do hereby declare that the following is a full, clear, and exact description of the same, reference being had to the accompanying drawings, and to the numerals of reference marked thereon, which form a part of this specification.

This application constitutes a continuation of my co-pending application for "Gas condenser and purifying systems", filed April 18th, 1914, Serial No. 832,919.

This invention relates more particularly to the construction of a tar extractor or scrubber for the gas as it issues from the mixing chamber after treatment with preheated condensates, or for the gas coming directly from the hydraulic main, retorts, ovens, generators, furnaces, or exit flues.
The gas to be passed through the scrubber contains impurities consisting principally of tar suspended in a finely divided state in the form of a fog or smoke, and the tar has associated therewith naphthalene and other by-products which it is desirable to remove. For this purpose the gas is passed through the scrubber or cooler which cools the gas and extracts the tar and suspended matter as quickly as possible, the cooling and tar extraction being done in practically a single operation.

It is an object therefore of this invention to construct an improved apparatus for the cooling of the gas and extraction of tar, suspended matter and other impurities therefrom, by the utilization of a counter-current of cold liquor condensates sprayed in the path of the gas which is caused to traverse a tortuous path.

It is also an object of this invention to construct an improved apparatus for the extraction of impurities from a gas simultaneously with the cooling operation, with mechanisms adjustable to control the quantity and velocity of flow of the gas for aiding in a proper mechanical separation of the impurities.

It is furthermore an important object of this invention to construct a tar, smoke and fume extractor embracing a plurality of baffle plates with the slots in staggered relation and with adjustable grid plates having variable openings to control the quantity and velocity of the gas passing through the apparatus.

It is finally an object of this invention to construct a simple and efficient apparatus for cooling and purifying the gas generated in the retorts, ovens, or furnaces.

The invention (in a preferred form) is illustrated in the drawings and hereinafter more fully described.

In the drawings: Figure 1 is a sectional view of a scrubber embodying the principles of my invention shown associated with a blower for forcing or drawing the gas thereinto. Fig. 2 is a fragmentary detail section taken on line 2—2 of Fig. 1. Fig. 3 is a fragmentary detail section taken on line 3—3 of Fig. 1. Fig. 4 is a detail section taken on line 4—4 of Fig. 3. Fig. 5 is a detail section taken on line 5—5 of Fig. 3. Fig. 6 is an enlarged fragmentary detail section taken on line 6—6 of Fig. 3. Fig. 7 is a detail section taken on line 7—7 of Fig. 6.

As shown in the drawings: The scrubber consists of a cylindrical or any other suitably shaped casing or tank 1, with an inlet pipe 2, of relatively large size communicating through the side wall slightly below the middle portion thereof. The gas entering said tank 1, flows into a compartment 3, the lower walls of which are formed by a double conical baffle plate member 4, which is secured at its upper periphery to the side walls of the tank. The outlet from the scrubber tank is at the upper end thereof and consists of a pipe 5, so that the gases introduced into the scrubber are constrained to flow upwardly therethrough. During such upward passage the gas first flows through a pair of adjustable grid members, the lower pair of which consists of a normally stationary horizontal slotted grid plate 6, which is supported upon angle irons 7, secured on the inner walls of the scrubber casing. Said plate 6, is provided with a plurality of parallel slots 8, and the sides of the plate, resting upon the angle irons 7, are recessed to receive the edges of a pair of adjustable plates or grids 9, slidably therein, each of which is also slotted, as indicated by the reference numeral 10. Said upper plate 6, is provided with a downwardly extending centrally disposed T portion 11, adapted to receive on each side thereof one of the projecting edges of the respective adjustable grid plates 9.

One wall of the scrubber tank is cut away, as clearly shown in Figs. 3 and 5, permitting a flanged extension or cover plate 12, integral with the upper slotted grid plate 6, to fit thereover. It is thus readily apparent that said associated grid plates 6 and 9, may be removed from the scrubber by merely sliding the same outwardly upon the angle iron guides 7, through an opening provided in the casing which is normally maintained closed by said cover plate 12. For the purpose of adjusting the pair of lower grid plates 9, with respect to the fixed grid plate 6, long lead screws 13, are rigidly secured in the end of each of said plates 9, and project outwardly through a packing gland 14, provided in extensions of the cover plate 12, and are each engaged by a threaded nut 15, having a hand wheel 16, integral thereon for the purpose of rotating the same. Said nut is provided with a circular flange which engages behind a semi-circular groove boss 17, projecting outwardly from said cover plate, thus retaining said nut in a fixed position, but permitting the same to rotate in order to move the adjustable grid.

Disposed directly above the respective grid plates 6 and 9, is another set of adjustable grid plates exactly similar in construction, and denoted by the reference numerals 18 and 19, respectively, in this case, however, the stationary plate being the lowermost, as indicated by the reference numeral 18. The slots in the grid plate 18, however, although parallel to the slots in the lower grid plates, are staggered with respect thereto, as clearly shown in Fig. 5. However, the operating mechanism for shifting the upper adjustable grid plates 19, with respect to the lower grid plate 18, is exactly the same as that already described. Extending horizontally across the interior of said scrubber tank 1, and disposed directly above and closely adjacent to the upper set of grid plates 18—19, is a fixed baffle plate 20, provided with a plurality of slots therein, which are parallel to the slots in said upper pair of grid plates, but staggered with respect thereto.

Mounted horizontally within the tank 1, closely adjacent and superposed one above the other, are a series of baffle plates, each composed of a plurality of horizontal bars arranged in parallel relation affording passages therebetween. The first baffle plate is denoted by the reference numeral 21, and is disposed directly above the fixed slotted baffle plate 20. Mounted thereabove is another baffle plate 22, with the bars running cross-wise of the bars of the plate 21, and with the arrangement of the respective succeeding baffle plates 23, 24, 25, 26, 27, 28, and 29, the latter of which is at the top of the scrubber.

The gas is cooled in its tortuous passage upwardly through the tank 1, and the tar is removed by contact with the cold liquor which is introduced at the top of the scrubber through spray nozzles 30, the liquor percolating downwardly through the baffle plates and collecting in the lower end of the scrubber. The cool liquor introduced through the spray nozzles 30, is obtained from a compartment in the lower end of the scrubber tank through a small outlet pipe 31, which communicates with a pump 32, having an outlet pipe 33, therefrom, provided with a valve 34, leading upwardly to a liquor cooler of any suitable type, designated as a whole by the reference numeral 35. The cooled condensates from said cooler 35, pass upwardly to the nozzles 30, through a pipe 36, which is connected to said nozzles by short pipes 37. Said pipe 36, is also extended beyond the point of connection of the pipes 37, and is provided with a valve 38, and beyond said valve are pipes 39, leading downwardly to spray nozzles 40, mounted in a horizontal section of the inlet gas pipe 2. A discharge pipe 41, is connected in the lower end of the scrubber 1, being also connected by means of a pipe 42, with the lower end of the gas inlet pipe 2, to receive any liquid condensates collecting therein, and an outlet pipe is connected to said discharge pipes 41 and 42, through a suitable T, said outlet pipe being in the form of a U-connection, to afford a seal for said discharge pipes, as indicated by the reference numeral 43. A valved pipe 44, is connected to the pipe 31, for the purpose of introducing an additional supply of liquor to the apparatus, if necessary or desirable.

The operation is as follows: By this apparatus an improved process for purification of the gas may be used, the tar, napthalene, suspended matter and other impurities being effectually removed and the valuable heat and light giving elements of the gas allowed to remain therein and the clean gas allowed to pass on. The adjustable grids may be set to allow any desired degree of velocity of flow to take place therethrough, and inasmuch as the precipitation of the undesirable elements is a function of the velocity of the gas, it is readily apparent that by adusting said grids the apparatus may be utilized to handle different quantities of gas equally well. Due to the tortuous path the gas is constrained to take in its passage through the scrubber, the impurities are mechanically thrown out and the action of the cold condensate liquor cools the gas as well as washing the impurities therefrom. The purpose of the small pipe 45, shown communicating into the horizontal length of the inlet pipe 2, adjacent the spray nozzles 40, is to introduce live steam into the inlet pipe if so desired. As shown, a blower 46, is connected to the inlet gas pipe 2, for the purpose of augmenting the flow through the scrubber, or of course, if desired, may be connected to the outlet pipe 5.

I am aware that various details of construction may be varied through a wide range without departing from the principles of this invention, and I therefore do not purpose limiting the patent granted otherwise than necessitated by the prior art.

I claim as my invention:

1. In an apparatus for treating gas as it comes from the retorts, a scrubber, and a plurality of superposed grid plates adjustable for regulating the flow of gas through said scrubber.

2. In an apparatus for treating gas as it comes from the retorts, a scrubber, and superposed adjustable grid plates arranged staggered to each other in said scrubber having a plurality of openings for regulating the passage of gas through the scrubber.

3. In an apparatus for treating gas as it comes from the retorts, a scrubber, and a series of pairs of grids arranged in staggered relation above one another through which the gas passes to said scrubber, and means for regulating the openings through said grids.

4. In an apparatus for treating gas as it comes from the retorts, a scrubber, pairs of superposed grids arranged in staggered relation through which the gas passes to said scrubber, and means for adjusting one of said grids of each pair with relation to the other to regulate the passage of the gas.

5. In an apparatus for treating gas as it comes from the retorts, a scrubber, a pair of superposed grids through which the gas passes to said scrubber, means for adjusting one grid linearly with relation to the other to regulate the passage of gas, and a baffle plate above said grids against which the gas impinges.

6. In an apparatus for treating gas as it comes from the retorts, a scrubber, a pair of superposed grids through which the gas passes to said scrubber, and a screw for adjusting one grid linearly with relation to the other.

7. In a device of the class described a tank, a plurality of baffle plates therein, a double pair of grid plates in said tank below said baffle plates, certain plates of each of said pair of grid plates adjustable to vary the area of opening therethrough, and means introducing liquor into said tank at the top thereof.

8. In a scrubber of the class described a tank, an inlet for gas near one end thereof, an outlet near the other end of said tank, a plurality of baffle plates within said tank, linearly adjustable grid plates within the same to control the quantity and velocity of gas flowing therethrough, and means introducing liquor at the upper end of the tank to permit a counter-current flow thereof with respect to the gas moving through the tank.

9. In a device of the class described a tank, a plurality of baffle plates arranged therein with the openings therethrough disposed cross-wise of one another, and a plurality of pairs of adjustable grid plates mounted at one end of the tank to control the flow of the gas therethrough.

10. In a scrubber of the class described a tank, an inlet for gas near the middle thereof, an outlet near the upper end of said tank, a plurality of baffle plates within said tank, adjustable grid plates to control the quantity and velocity of gas flowing through the tank, means for collecting and separating the tar or suspended matter removed from the gas, in the bottom of said tank, means introducing liquor at the upper end of the tank to permit a counter-current flow thereof with respect to the gas moving through the tanks, means for cooling the liquor prior to introduction thereof into the tank, and connections between said cooler and the collecting and separating means at the bottom of the tanks.

11. In a scrubber tank of the class described a casing, a gas inlet near the middle thereof, a gas outlet at the upper end thereof, a plurality of baffle plates arranged within said tanks between the inlet and outlet thereof, adjustable grid plates for controlling the quantity and velocity of flow of gas through said tank, means introducing a spray of liquor at the upper end of the tank, a cooler for cooling the liquor introduced, a separating and collecting chamber formed at the lower end of the tank beneath the gas inlet for the impurities and condensate liquors passing down through said tank, connections between said chamber and said cooler whereby the separated liquor may be passed into the cooler, and power driven means for forcing the gas to be purified into said tank.

12. The combination with a scrubber having baffle plates therein and adjustable grid plates for controlling the quantity and velocity of flow of gas through the scrubber, of power driven means for inducing a flow of gas through said scrubber.

In testimony whereof I have hereunto subscribed my name in the presence of two subscribing witnesses.

BENJAMIN M. FERGUSON.

Witnesses:
    CHARLES W. HILLS, Jr.,
    FRANK K. HUDSON.